United States Patent [19]
Whitney

[11] Patent Number: 5,646,864
[45] Date of Patent: Jul. 8, 1997

[54] EVENT CORRELATION IN TELECOMMUNICATIONS NETWORKS

[75] Inventor: Christopher Whitney, Bath, United Kingdom

[73] Assignee: British Telecommunications public limited company, London, England

[21] Appl. No.: 507,255

[22] PCT Filed: Dec. 7, 1993

[86] PCT No.: PCT/GB93/02502

§ 371 Date: Nov. 16, 1995

§ 102(e) Date: Nov. 16, 1995

[87] PCT Pub. No.: WO94/19887

PCT Pub. Date: Sep. 1, 1994

[30] Foreign Application Priority Data

Feb. 23, 1993 [GB] United Kingdom ............... 9303640

[51] Int. Cl.[6] .................................................. G06F 17/00
[52] U.S. Cl. ...................................................... 364/514 B
[58] Field of Search .......................... 364/514 B, 514 R; 395/182.01, 181, 185.01, 183.02, 183.21, 200.11; 340/825.1

[56] References Cited

U.S. PATENT DOCUMENTS

| 5,157,667 | 10/1992 | Carusone, Jr. et al. | 395/183.21 |
| 5,253,184 | 10/1993 | Kleinschnitz | 364/551.01 |
| 5,483,637 | 1/1996 | Winokur et al. | 395/183.02 |
| 5,594,861 | 1/1997 | Jonsson et al. | 395/185.01 |

Primary Examiner—Ellis B. Ramirez
Attorney, Agent, or Firm—Nixon & Vanderhye P.C.

[57] ABSTRACT

A telecommunication network is monitored for fault conditions. In order to correlate the alarms to established which alarms have a common cause, a logical connectivity model is used in which a logical property is transferred between related logical elements in response to the element being alarmed. If as a result of such transfer the value of the logical property exceeds a threshold value for any element a correlation is established and the element highlighted as the probable cause of the alarms.

12 Claims, 3 Drawing Sheets

EVENT CORRELATION IN TELECOMMUNICATIONS NETWORKS

This invention relates to a method of correlating events in a telecommunication network. The correlation method is based on the use of a model of the network in which at least some of the network elements are represented in a computer simulation by respective program modules. The invention finds particular but not exclusive application in the correlation of transmission network alarms, that is, the identification of the single most probable cause of a group of alarms.

Telecommunications networks are normally composed of a hierarchy of various types of equipment or network elements, as shown partially in FIG. 1. These types include bearers 1 to 5, and multiplexers 6 to 9. Multiplexers enable a number of low-speed circuits to be carried over a single higher speed bearer. The multiplexed bearer is said to carry a number of tributary circuits, for example, a 2-8 multiplexer 6 combines four 2 Mbit/s channels or tributaries on to an 8 Mbit/s bearer. The 8 Mbit/s bearer can be thought of logically as four tributary circuits. A series of multiplexers, e.g. 2-8 multiplexer 6, 8-34 multiplexer 7, and 34-140 multiplexers 8, allow construction of the multiplexed hierarchy. There are also skip multiplexers, such as the 2-34 multiplexer 9, that step up two or more transmission rate levels in one piece of equipment. A complete end-to-end circuit is made up of a number of bearers.

Multiplexing is used to reduce transmission costs by improving bearer media usage (a 565 Mbit/s bearer circuit can carry 7680 channels) and to decrease the number of bearer channels that need to be monitored and maintained so improving the manageability of the network.

The pieces of equipment in the network can develop faults such as loss of synchronization, power failure or degraded signal. The pieces of equipment will send out alarm signals which are converted to alarm reports by the monitoring systems. Other items of equipment dependent on an item with a fault will also register alarm messages as their function is prevented by the fault. Further equipment dependent on these may also send alarms and so on. Thus one higher order item of equipment failing can result in a deluge of alarms. It can be difficult to identify quickly and accurately the cause of all the alarms, which can result in delays in rectifying the fault.

The purpose of correlation of alarm signals in a telecommunications network is to reduce the amount of raw information passed on to the network managers and to add value to the information that is passed on. As a result of correlation, the raw fault reports are processed into fewer, richer correlation reports, allowing maintenance engineers to identify necessary repairs and prioritise them.

Correlation in this context means identifying the single probable cause of a group of alarms using information in the alarms themselves and in the model of the network. The correlation is performed in real time to provide identification of the root cause of the faults. To achieve this manually is an arduous and time consuming task as the monitoring systems can generate a wealth of alarms as a result of a single network fault.

A particular complication in large networks built up over a long period is that not all equipment is monitored or the monitoring systems are inconsistent in the conditions which cause alarms. So a complete set of alarms is unlikely. It is also possible for the alarm itself to fail. Also the different technologies involved mean that not all alarms pertaining to a particular fault will be received at the same time. It is important that such factors do not prevent a current correlation being made on the basis of other alarms.

Correlation can also be used in contexts other than alarm monitoring. For example, it can be used to monitor how a system functions, for example monitoring what effects occur as a result of network reconfigurations. It may also be used to identify traffic patterns, for planning, market research, or fraud detection purposes.

According to The present invention there is provided a method of correlating events occurring in a telecommunications network formed from individual network elements, at least some o f the network elements being represented in a computer by individual program modules, each program module having a set of data relating to the network elements which it represents and, in the case of at least some of said program modules, the data set of the module including a) a list of network elements having incoming associations with the network element represented by the module in respect to event correlation, b) a list of network elements having outgoing associations with the network element represented by the module with respect to event correlation, and c) a parameter indicating the state of activation of the program module at a point at which events can be correlated, said method comprising the steps of increasing the value of the activation parameter of a program module when an event occurs in the network element represented by the program module, varying the values of the activation, parameters of the modules in accordance with the lists of associations between the network elements in a predetermined manner, and producing a positive correlation report in a respect of an individual program module when the level of its activation parameter exceeds a predetermined threshold.

The use of the method according to the invention has a number of advantages.

Firstly, by setting the threshold of the activation parameter appropriately, the user can balance the sensitivity to a suitable compromise between false, repeated, and missed correlations.

Secondly, the method establishes a correlation based solely on the association between network elements which have reported an event. There is no need to have knowledge of which network elements are capable of reporting an event, and a failure of one element to report an event does not necessarily cause the failure of the correlation.

In order that correlations only take place between events that occur close together in time, the method may include the step of causing the activation parameter in the program modules to vary with time in a predetermined manner.

In the method of the present invention it can be arranged that a positive correlation report is issued when appropriate by setting the threshold of the activation parameter to a suitable value which balances the need for sensitivity of the method in determining correlations with the need not to swamp the user with repeated correlations before remedial action can be taken.

An embodiment of the invention will now be described, by way of example only, with reference to the accompanying drawings in which.

The transmission domain of a telecommunications network is a suitable candidate for an object-oriented representation. There are clearly defined "objects" in the domain, both logical and physical. The object-oriented approach allows these objects to be represented as naturally as possible. The model of this embodiment uses the object oriented approach.

With the object-oriented approach, individual physical network elements or objects are modelled by respective program modules (software objects). Each program module has a set of data attributes which represent the actual attributes of the physical network element. For example, in the case of a program module representing a circuit, the attributes may include the name of the circuit, the end points of the circuit, the bandwidth of the circuit, the circuit type, the name of higher order circuit of which it is a tributary and the names of the lower order circuits which it carries.

The embodiment described below uses a model of a telecommunications network based on an interpretation of the managed objects defined by the Network Management Forum (NMF), an industry consortium of international computing and network equipment suppliers, service providers and users and published as "OSI/NMF Library of Managed Object Classes, Name Bindings and Attributes". This document sets out definitions for operable communications network management products that support alarm management. The architecture is based on ISO standards and CCITT recommendations.

Figure 1:
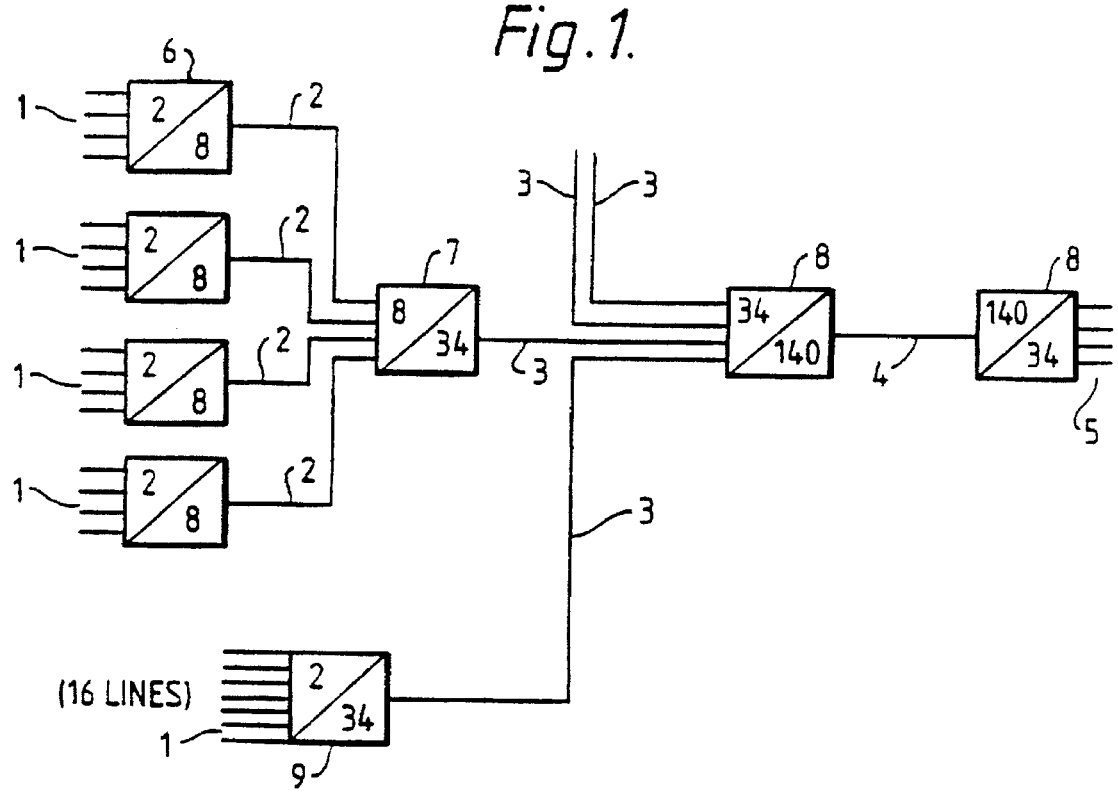
FIG. 1 is a schematic diagram of digital hierarchy network elements in a telecommunications network.
Figure 2:
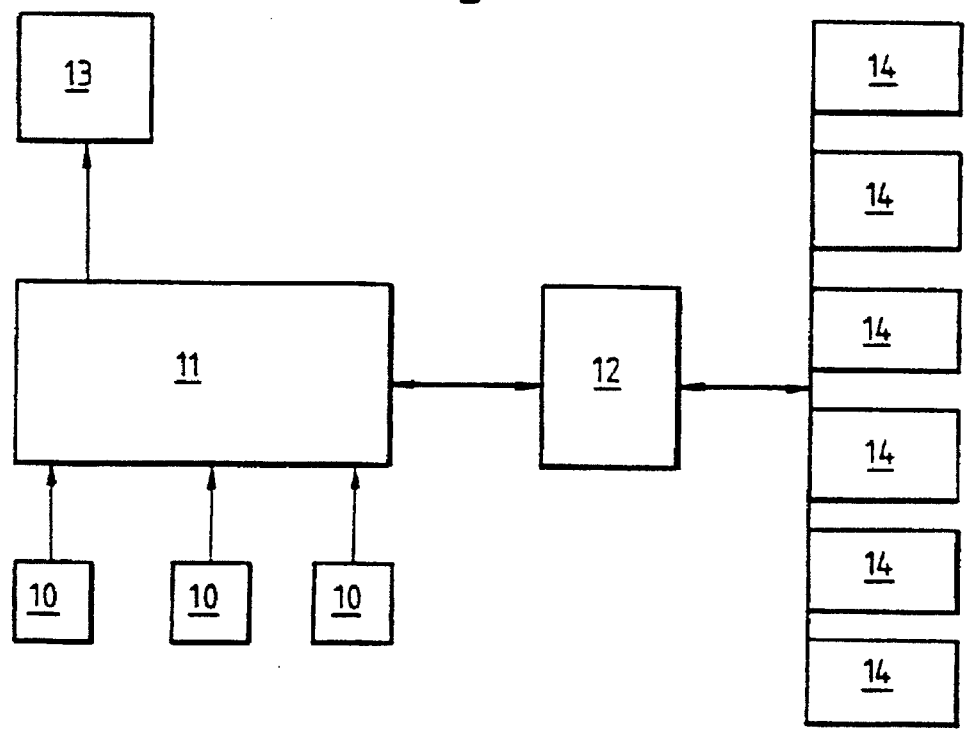
FIG. 2 is a schematic diagram of an alarm correlation system operating according to the invention.

Referring now to FIG. 2, there is shown an alarm correlation system for a telecommunications network which embodies this invention. The correlation system includes alarm sources 10 which detect alarm conditions in the individual circuits of the network and send alarm signals to a correlator 11. The correlator 11 uses the object-oriented model of the network to correlate the alarm signals using a correlation process which will be described below and sends the results of correlation to a workstation 13. The correlator 11 uses data from a network configuration model (NCM) 12 having a structure corresponding to that the object-oriented model used by the correlator 11 which receives data on the arrangement and organisation of the network from disparate databases 14 and converts this data into a common format usable by the correlator 11.

The correlation process used in correlator 11 builds on the work described in a paper "SITUATED AGENTS CAN HAVE GOALS" by Pattie Maes ("Robotic and Autonomous Systems" Volume 6 (1990) pages 49–70). This paper, which is incorporated herein by reference, introduces the concept of ascribing a numerical parameter (referred to as "activation energy" in the paper) to each object of a system. The value of this parameter for each object of the system is determined according to rules which depend on the relationships between the objects. Each object has two or more logical states, and a state change is triggered when the object reaches an "activation threshold". This state change causes changes in the relationships between the objects, which causes further changes in the activation energy of the objects. An external stimulus, such as a requirement for a particular task or "goal" to be achieved, injects activation energy into the system. State changes and consequent changes in activation energy then take place until the state change which is required (the "goal") is achieved by the object which represents that goal achieving its "activation threshold".

In this invention the alarms correspond to the external stimuli, and a correlation to a 'goal'. Thus the generation of a number of alarms at different objects will cause a correlation to take place for an object associated with all the alarmed objects, which is likely to be the location of the actual fault.

Important to the correlation process is a determination of how long an alarm or a correlation should be deemed valid and appropriate for use for correlation. If alarms and correlations were to last indefinitely then eventually the program modules representing every circuit in the network would be activated and the whole model would be correlated.

Figure 3:
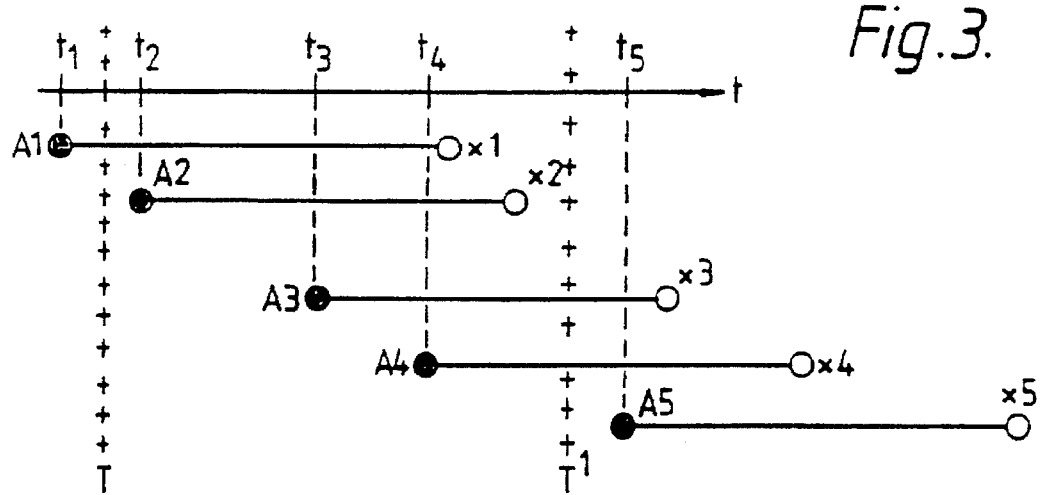
FIG. 3 is a diagram of a correlation window.

To prevent this occurring a correlation window may be defined. In FIG. 3 time is shown along the axis t. Alarm events A1, A2, A3, A4 and A5 occur at different times $t_1$, $t_2$, $t_3$, $t_4$ and $t_5$.

A correlation window is the period T to $T^1$ during which a set of alarms are correlated. The lifetime of an alarm (e.g. from A2 to X2) must be approximately the same length as the correlation window so that related alarms do not appear and disappear without being correlated. However, the lifetime of an alarm should not be so great so as to persist in many correlation windows and possibly give false results. So, for example alarms A1, A2, A3 and A4 will all be correlated with each other because they all occur within the window T to $T^1$. Alarms A3 and A4 will also be correlated with alarm A5 as they all occur within the next window. However alarms A1 and A2 are not correlated with alarm A5 as the time interval between A5 and the other two alarms is too great to be significant.

It is desirable for correlation processes to recognise that alarms and correlations only have a certain lifetime in which they are useful and after which they should be ignored or removed.

The present invention is primarily but not exclusively concerned with a process for carrying out connective correlation on a telecommunications network and this embodiment takes full advantage of the benefits provided by object-orientation in order to achieve this. Connective correlation is a type of correlation in which common associations between data are correlated. In the context of a telecommunications network, an example of this would be that three recent alarms originated from individual lower order circuits which are all carried by a common higher order circuit. The correlator 11 performs connective correlation by exploiting two types of association between circuit objects contained within the correlator 11 namely a "CARRIED-BY" association and a "CARRIES" association. For each program module which represents a circuit object, these two associations may be part of the set of data attributes which represent the actual attributes of the physical circuit object. Alternatively, each of these program modules may be provided with a portion of code for deriving the associations from other data.

The "CARRIED-BY" association exists between two circuit objects A and B if:

A is a lower order circuit

B is a higher order circuit

A is carried by B, that is A is a circuit routed over a tributary of B

The CARRIED-BY association is a one-to-many relationship, that is a Lower order circuit can be carried by more than one higher order circuit, as would be the case if the lower-order circuit is multiplexed onto another circuit which is itself further multiplexed onto a further circuit.

Figure 4:
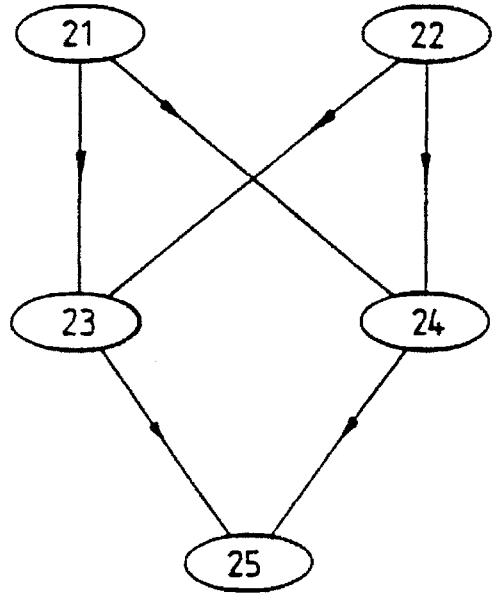
FIG. 4 is a diagram of a logical relationship between the elements of the network of FIG. 1.

FIG. 4 illustrates the CARRIED-BY association contained within the model used by correlator 11. The association identifies a set of higher order circuit objects that all carry a lower order circuit object. It is this association that provides the structure to the model as it defines how circuits are physically related in the actual network. For example if two 2 Mbit/s circuits 21, 22 are routed over an 8 Mbit/s circuit 23 in the actual network then as shown in FIG. 4 there will be CARRIED-BY associations between the 2 Mbit/s and 8 Mbit/s software circuit objects 21, 22, 23 representing these circuits in the model. In the same way if two 8 Mbit/s circuits 23, 24 are routed over a 34 Mbit/s circuit 25 in the actual network, as shown in FIG. 4 then there will be CARRIED-BY associations between the corresponding 8 Mbit/s and 34 Mbit/s software circuit objects 23, 24, 25. It can he seen that it is these CARRIED-BY associations that provide the object-oriented model of correlator 11 with its strict hierarchical structure. Every software circuit object is related to other software circuit objects by the CARRIED-BY association. It should be noted that a lower order circuit can be carried by more than one higher order circuit. For example 2 Mbit/s circuits 21, 22 are carried by both 8 Mbit/s circuit 23, 24. This is possible because each circuit is defined as the complete end-to-end routing. Between these end points it may be carried on several higher-order bearers, some of which themselves may be carried on even higher-order circuits. For each software circuit object, the CARRIED-BY associations provide a list of outgoing associations relevant to correlation.

A "CARRIES" association exists between two circuit objects A and B if:

A is a higher order circuit

B is a lower order circuit

A carries B, cleat is A has B routed over one of its tributaries.

Figure 5:
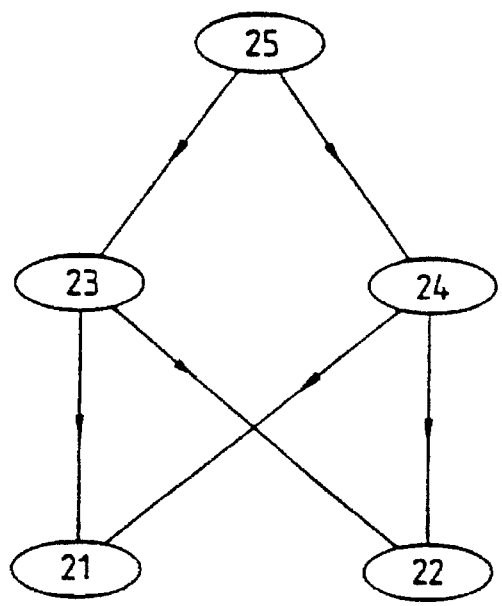
FIG. 5 is a diagram of another logical relationship between the elements of the network of FIG. 1.

The CARRIES association also is also a one to many relationship. That is a higher order circuit can carry many lower order circuits. The association identifies a set of lower order circuits that are carried over a higher order circuit. For example, as shown in FIG. 5 if an 8 Mbit/s circuit carries two 2 Mbit/s circuits 21, 22 in the actual network, there will be CARRIES associations between the software circuit objects 23, 21, 22 that represent these circuits in the model used by correlator 11. In the same way if a 34 Mbit/s circuit carries two 8 Mbit/s circuits 23, 24 in the actual network, then as shown in FIG. 5 there will be CARRIES associations between the respective objects 25, 23, 24 in the model.

As will be described below, the CARRIES association is also used in the correlation process. The CARRIES association is also used after a correlation has been produced to identify all the potentially affected circuits. For each software circuit object, the CARRIES associations provide a list of incoming associations relevant to correlation.

The rationale behind this is that if two circuits are alarming and these two circuits are carried by higher order circuits that are common to the alarming circuits, then it may be that these common circuits are at fault and should therefore be reported or may become candidates for further correlation.

The attributes of each software circuit object also include a parameter which indicates its state of activation as the point at which alarms may be correlated. The activation parameter corresponds to the activation energy described by Maes.

The correlation process operates as follows. When an alarm is received from one of the physical circuit objects, the activation parameter for the corresponding software circuit object is increased by a fixed amount. This causes an increase in the activation parameter in each object associated with the alarming object by the CARRIED-BY associations in an attempt to correlate higher order objects with linear associations in relation to the alarming object. The value of the activation parameter for each of the software circuit objects on its list of outgoing associations is therefore increased. The activation parameters higher order software circuit objects are then increased in turn in a similar manner.

Changes in activation parameter can also be passed backwards along the CARRIES association to software circuit objects whose activation parameters have not yet increased. More specifically, when a software circuit object activation parameter increases as a result of a change in a lower order software circuit object, it causes an increase in the activation parameter of each of the software circuit objects of its list of incoming associations which have not yet activated. The increase in activation parameter caused in this way is not on its own enough to trigger the alarm at the receiving object, but such an object will be triggered if it receives prompts in this way from several downstream connections.

A positive correlation report is produced in respect of a particular software circuit object when the level of its activation parameter exceeds a predetermined threshold.

Generally, alarms produced by lower order circuit objects are progressively less relevant to circuit objects of progressively higher orders. This is reflected in the correlation process of this invention by the fact that a software circuit object causes a proportionally smaller increase in activation parameter in a associated object further forwards along its CARRIED-BY associations. For example, alarms received by two 2 Mbit/s software circuit objects may be sufficient to produce a positive correlation report, for an 8/Mbit/s circuit object. In this context, it may be necessary for three or more 2 Mbit/s software circuit objects to receive alarms before a positive correlation report is produced for a 34 Mbit/s circuit object. The correlation process is therefore effective even if some of the physical software objects are not monitored for alarm conditions.

Figure 7:
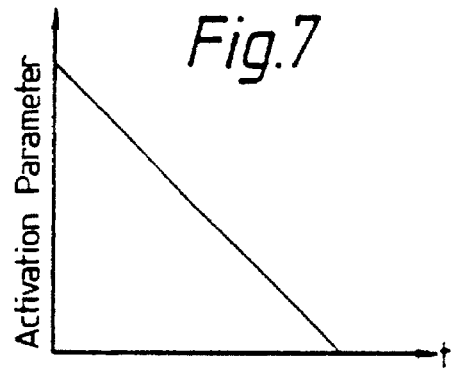
Figure 8:

As described previously, alarms and correlations are only useful for a predetermined length of time known as the correlation window. In order to reflect this, the activation parameters in the software circuit objects is subjected to decay in accordance with a decay function as shown in FIG. 6, 7 or 8, in which the activation parameter level E is shown on the vertical axis and time on the horizontal axis.

Figure 6:
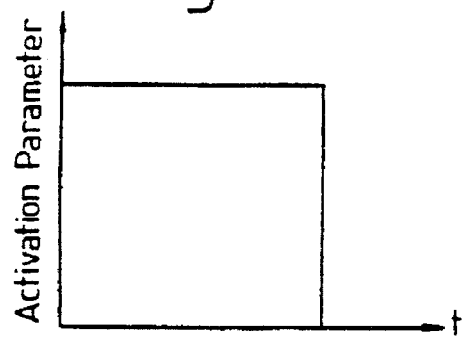
FIGS. 6, 7 and 8 show typical decay functions for an activation parameter.

The fall in activation parameter may be a simple step function, as shown in FIG. 6, corresponding to a requirement for the alarm to be correlated only with others occurring within a predetermined period, with all such alarms occurring within that period being given equal weight. More realistically the activation level may be arranged to fall in a decay function (e.g. linear as shown in FIG. 7 or asymptotic), such that alarms occurring further apart in time are given a smaller (but non-zero) weighting than those occurring nearly simultaneously.

The decay function can take any form suitable for the characteristics of the individual system. In most cases the function will decline monotonically (i.e. it will have negative gradient throughout) as shown in FIG. 7 but in certain situations zero gradient (FIG. 6) or even positive gradients are possible, for example if inherent delays in the system (such as coding delays) result in two simultaneous alarms being less likely to have a common cause than if they are separated by a short delay. Such a decay function is shown in FIG. 8, in which the parameter first rises steeply and then decays exponentially towards zero.

Any of these functions may be modelled in practice as a series of steps. The activation parameter lost in the decay may simply be lost to the system altogether or it may activate a module to alert the user to the uncorrelated alarm.

Figure 9:
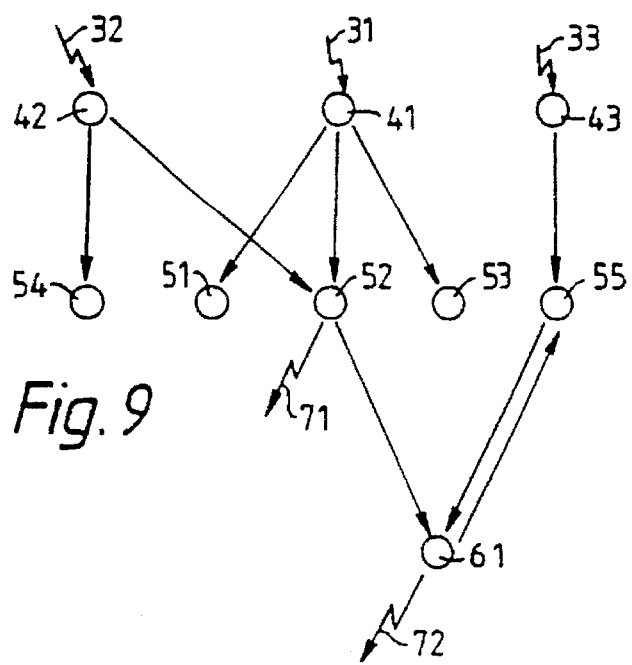
FIG. 9 shows a fragment of a network model.

An example will illustrate how a correlation can be produced from alarms on two 2 Mbit/s circuits. It will then be shown how a positive correlation report for a 34 Mbit/s circuit can be produced from a further alarm on a 2 Mbit/s circuit. Consider the fragment of the model shown in FIG. 9.

The arrival of the first alarm 31 results in a 2 Mbit/s circuit object 41 causing an increase in activation parameter to all 8 Mbit/s circuit objects 51, 52, 53 that carry it. The 8 Mbit/s circuit objects 51, 52, 53 in turn cause an increase in activation parameters to all 34 Mbit/s circuit objects that carry them, and so on. When the second alarm 32 arrives at a 2 Mbit/s circuit object 42 it causes an increase in activation parameter to the 8 Mbit/s circuit objects 52, 54 that support it. However, this time the activation parameter in the 8 Mbit/s circuit object 52 crosses its threshold and this results in a positive correlation report 71. A further increase in activation parameter is again passed forward to circuit object 61. By now the 34 Mbit/s circuit object 61 has received two increases in activation parameter but the level of its activation parameter has not yet passed its threshold. It causes a further increase to the activation parameter of the 8 Mbit/s circuit object 55 that it carries to prompt it to activate. The arrival of alarm 33 at 2 Mbit/s circuit object 43 results in a further increase in the activation parameter of the 8 Mbit/s circuit object 55. Because of its raised activation parameter level object 55 can now cause a further increase in the activation parameter of the 34 Mbit/s circuit object 61. This time the level of activation parameter in the 34 Mbit/s circuit object exceeds its activation threshold and so a positive correlation report 72 is produced.

Once a positive correlation report has been produced, an "affected feature" report is also produced. This report lists all the circuits that are routed over the higher order circuit identified in the positive correlation report, i.e. all the circuits affected by this fault. The report is generated by using the CARRIES association. The report enables network operators to prioritise repair work and to respond to customer queries about problems with their circuits.

I claim:

1. A method of correlating events occurring in a telecommunications network formed from individual network elements, at least some of the network elements being represented in a computer by individual program modules, each program module having a set of data relating to the network elements which it represents and, in the case of at least some of said program modules, the data set of the module including a) a list of network elements having incoming associations with the network element represented by the module in respect to event correlation, b) a list of network elements having outgoing associations with the network element represented by the module with respect to event correlation, and c) a parameter indicating the state of activation of the program module at a point at which events can be correlated, said method comprising the steps of increasing the value of the activation parameter of a program module when an event occurs in the network element represented by the program module, varying the value of the activation parameter of the modules in accordance with the lists of associations between the network elements in a predetermined manner, and producing a positive correlation report in respect of an individual program module when the level of its activation parameter exceeds a predetermined threshold.

2. A method as claimed in claim 1, in which a change in the activation parameter of a program module causes a proportionally smaller change in the activation parameters of the program modules which represent higher order network elements.

3. A method as claimed in claim 1, in which a change the activation parameter of a module causes a proportionally smaller change in the activation parameters of the program modules which have not yet activated and which represent lower order network elements.

4. A method as claimed in claim 1, including the step of causing the activation parameter in the program modules to vary with time in a predetermined manner in addition to the variations in the activation parameters made in response to events in the network elements.

5. A method as claimed in claim 4, wherein the variation with time of the activation parameter of at least one module is a monotonic decay.

6. A method as claimed in claim 4, wherein the activation parameter of at least one module initially rises, and then decays monotonically.

7. A method as claimed in claim 5, where the decay in at Least one module is exponential.

8. A method as claimed in claim 5, wherein the decay in at least one module comprises one or more discrete steps.

9. A method as claimed in claim 1, in which at least some of the program modules represent physical circuits.

10. A method as claimed in claim 1 wherein the events occurring in the network are alarm signals indicating fault conditions detected at the corresponding network elements.

11. A method as claimed in claim 10, wherein a positive correlation report identifies the network element in which lies the fault that has caused the alarm signals.

12. A method as claimed in claim 10, wherein a positive correlation report identifies all network elements affected by the fault causing the alarm signals.

* * * * *